(12) United States Patent
Zick

(10) Patent No.: US 6,541,957 B1
(45) Date of Patent: Apr. 1, 2003

(54) METHOD AND APPARATUS FOR DETECTING MOTOR SHAFT COUPLING FEATURES

(75) Inventor: Kenneth E. Zick, Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 153 days.

(21) Appl. No.: 09/749,845

(22) Filed: Dec. 27, 2000

Related U.S. Application Data

(60) Provisional application No. 60/173,147, filed on Dec. 27, 1999.

(51) Int. Cl.[7] .................................................. G01P 3/49
(52) U.S. Cl. .................. 324/166; 324/173; 324/207.15; 324/179
(58) Field of Search ................................ 324/165, 166, 324/173, 174, 178, 179, 207.11–207.17, 207.2–207.25

(56) References Cited

U.S. PATENT DOCUMENTS

| | | | |
|---|---|---|---|
| 3,544,842 A | * 12/1970 | Yampolsky | 324/165 |
| 3,818,326 A | * 6/1974 | Masuda et al. | 324/174 |
| 4,142,152 A | 2/1979 | Fincher | |
| 4,150,653 A | * 4/1979 | Grancoin | 123/594 |
| 4,152,645 A | * 5/1979 | Bendler | 324/163 |
| 4,267,810 A | * 5/1981 | Wesemeyer et al. | 123/406.61 |
| 4,370,614 A | 1/1983 | Kawada et al. | |
| 4,378,004 A | * 3/1983 | Petrie | 123/406.61 |
| 4,450,403 A | * 5/1984 | Dreiseitl et al. | 324/165 |
| 4,847,555 A | * 7/1989 | Stammer et al. | 318/254 |
| 4,868,498 A | * 9/1989 | Lusinchi et al. | 324/173 |
| 5,218,860 A | * 6/1993 | Storar | 318/490 |
| 5,446,376 A | 8/1995 | Porter et al. | |
| 5,789,667 A | 8/1998 | Leader et al. | |
| 5,908,982 A | 6/1999 | Walsh et al. | |
| 5,918,225 A | 6/1999 | Dutka et al. | |

* cited by examiner

*Primary Examiner*—Jay Patidar
(74) *Attorney, Agent, or Firm*—Karl Vick, Esq.; Armstrong Teasdale LLP

(57) ABSTRACT

A method and apparatus for non-contact testing of a rotating shaft includes first and second proximity sensors coupled to an automated shaft testing system. Output signals from the proximity sensors are compared to empirically determined threshold values to determine the presence or absence of a shaft coupling characteristic, the speed of the rotating shaft, and the direction of rotation of the shaft when the shaft is oriented proximally to the sensors.

20 Claims, 4 Drawing Sheets

METHOD AND APPARATUS FOR DETECTING MOTOR SHAFT COUPLING FEATURES

CROSS REFERENCE TO RELATED APPLICATIONS

This application claims the benefit of U.S. Provisional Application No. 60/173,147, filed Dec. 27, 1999.

BACKGROUND OF THE INVENTION

This invention relates generally to rotating machinery, and, more particularly, to a method and apparatus for testing a rotating shaft for desired characteristics.

Rotating machinery is often subjected to tests before leaving a manufacturing plant. For example, in one type of rotating machinery, such as electric motors with rotating output shafts, in addition to meeting electrical characteristic specifications, a specified shaft configuration is often required by customers for a selected application. Desired shaft configurations include the presence of a coupling feature, such as, for example, a flat or a keyway, and a selected direction of rotation of the shaft, i.e., clockwise or counterclockwise rotation. Another item of interest is the speed of the motor, i.e., the speed of rotation of the output shaft. Rotating machinery manufacturing plants typically include automated testing equipment to ensure that assembled products meet these and other customer requirements.

Present automated final motor testing equipment of high volume manufacturing plants typically include a wheel mechanism coupled to a computer system. The wheel mechanism contacts the motor shaft surface, generating signals for analysis by the computer system to determine the direction of rotation of the shaft. An accelerometer is coupled to the wheel mechanism and detection circuitry generates a filtered representation of the amplitude of a signal from the accelerometer. By analyzing the signal amplitude, the computer system determines the presence or absence of a shaft coupling feature during a motor start test at full or reduced voltage.

Contact testing of the motor shaft, however, is disadvantaged in several aspects. For example, the wheel or contact mechanism tends to wear during high volume testing of motors, which affects the calibration and frequency response characteristics of detection circuitry. Also, when using fast cycling test sequences, the startup test may be completed too quickly for the filtered vibration signal to establish a reliable amplitude level to determine the absence of a shaft coupling feature.

Accordingly, it would be desirable to provide a longer life motor shaft testing apparatus and method for application in high volume motor testing that is less susceptible to calibration effects over time and that may be reliably used even when fast cycling techniques are employed.

BRIEF SUMMARY OF THE INVENTION

In an exemplary embodiment of the invention, a motor shaft testing apparatus for non-contact testing of a rotating motor shaft includes a first proximity sensor coupled to an automated motor test system. The automated motor test system includes a microprocessor and circuitry adapted for at least one of a digital multimeter function and an oscilloscope function for analyzing an output signal form the first proximity sensor to determine the presence or absence of a coupling characteristic, such as a flat, on a given motor shaft oriented proximally to the first proximity sensor.

More specifically, the automated test system generates a first waveform corresponding to the first signal. Through comparative evaluation of the generated signal and predetermined threshold values, such as, for example, comparing an amplitude of the waveform with an empirically determined amplitude to detect the presence of the coupling characteristic on the shaft, a non-contact testing apparatus is provided that reliably detects shaft coupling characteristics.

In other aspects of the invention, shaft speed may also be detected by determining a pulse frequency of the output signal of the first proximity sensor, and, with the addition of a second proximity sensor generating a second output signal, a phase relationship between output signals of the first and second proximity sensors is determined, thereby indicating a direction of rotation of the shaft.

DETAILED DESCRIPTION OF THE INVENTION

Figure 1:
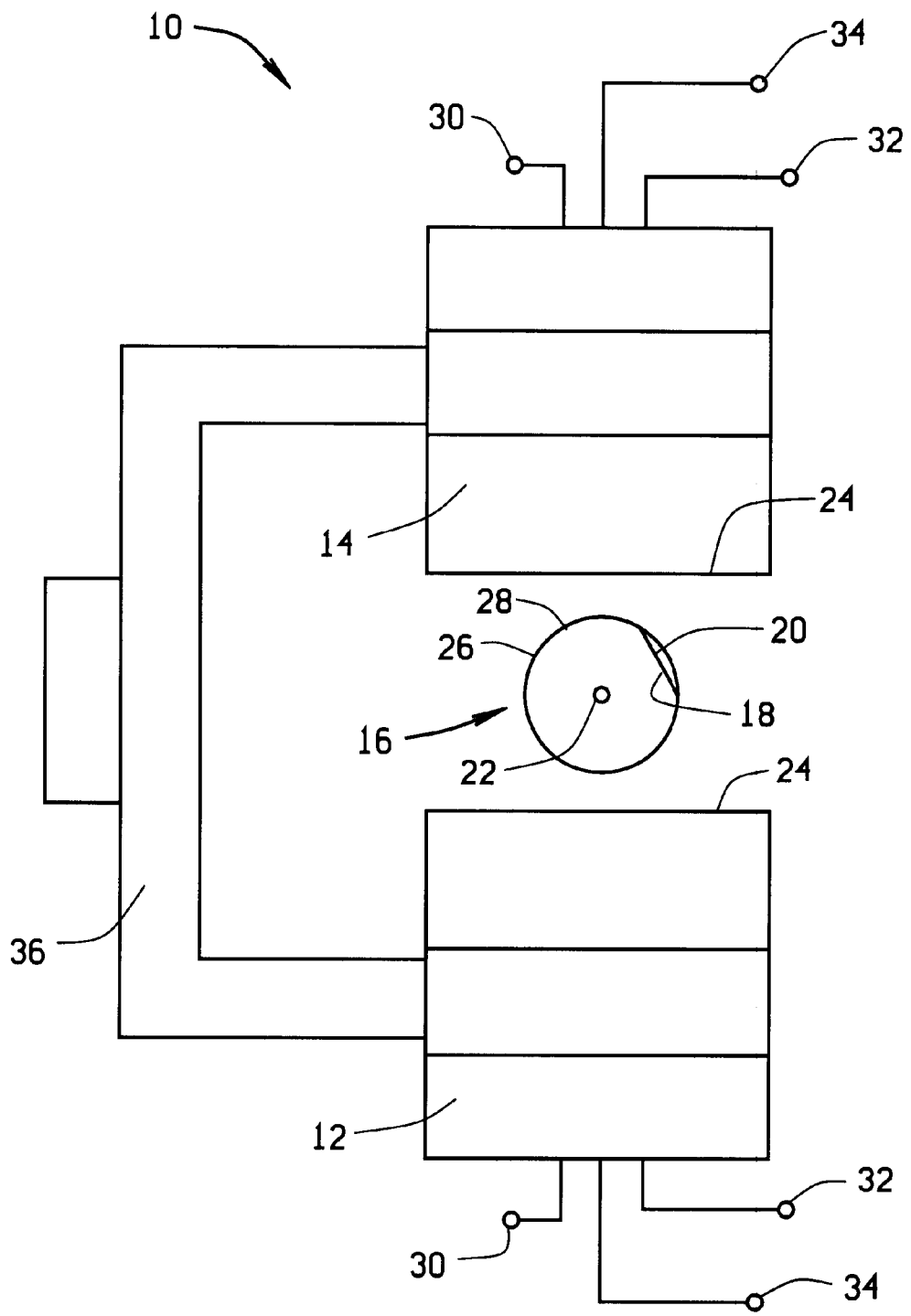
FIG. 1 is a partial schematic view of an exemplary non-contact motor testing apparatus.

FIG. 1 is a partial schematic view of an exemplary non-contact motor testing apparatus 10 including a first proximity sensor 12 and a second proximity sensor 14 substantially centered about an exemplary electric motor shaft 16 of an electric motor (not shown) to be tested. In one embodiment, motor shaft 16 is approximately ½ inch in diameter and includes a flat 18 with a depth of approximately 0.046 inches for coupling to a drive component (not shown). An outer surface 20 of flat 18 is closer to a center 22 of shaft 16, or, alternatively, flat outer surface 20 is located farther away from a sensing face 24 of first and second proximity sensors 12, 14 than a circular portion 26 of shaft outer surface 28. Therefore, as shaft 16 is rotated, flat 18 passing in front of sensor faces 24 creates a variance in output signals from first and second proximity sensors 12, 14.

First and second proximity sensors 12, 14 are selected from a variety of known proximity sensors. In a particular embodiment, proximity sensors 12, 14 are approximately 18 millimeters in diameter and include a threaded cylindrical body (not shown), such as linear induction proximity sensors commercially available from Baumer Electric Ltd, of Southington, Conn. Each of first and second proximity sensors 12, 14 are powered by a DC voltage source (not shown) of 15 to 30 volts through a power terminal 30. A 1V to 9V output terminal 32 couples to an instrument analog input channel (not shown) of an automated motor testing system (not shown in FIG. 1) described below. A common terminal 34 couples to ground.

First and second proximity sensors 12, 14 are mounted on, for example, a sensor bracket 36 to maintain first and second sensors 12, 14 in position, or a predetermined distance, relative to one another and to motor shaft 16. In one embodiment, first and second sensors 12, 14 are positioned approximately 180 degrees from one another about motor shaft center 22 and approximately ⅛ inch from circular portion 26 of motor shaft outer surface 28. When proximity sensors 12, 14 are oriented proximally to motor shaft 16, an analog output of one of the sensors, such as first proximity sensor 12, is sufficient to determine whether shaft 16 is rotating and whether a coupling characteristic of motor shaft, such as flat 18 or a keyway, is present. An analog output of both first and second proximity sensors 12, 14 is required to determine a direction of rotation of shaft 16, further explained below. While first and second proximity sensors 12, 14 are positioned approximately equidistant from shaft center 22 and are oriented approximately 180 degrees from one another to facilitate signal processing, it is contemplated that other spatial and angular positions of first and second sensors 12, 14, are employed in alternative embodiments without departing from the scope of the present invention. Also, first and second sensors 12, 14 need not be identical, and need not be spaced an equal distance from shaft center 22.

In one embodiment, sensor bracket 36 is moved into position adjacent motor shaft 16 so that first and second proximity sensors 12, 14 are positioned on either side of motor shaft 16. Alternatively, motor shaft 16 is moved into position between first and second proximity sensors 12, 14. It is contemplated that a wide variety of positioning mechanisms (not shown), manual or automatic, could be employed to orient first proximity sensor 12, second proximity sensor 14, and motor shaft 16 relative to one another without departing from the scope of the present invention.

Figure 2:
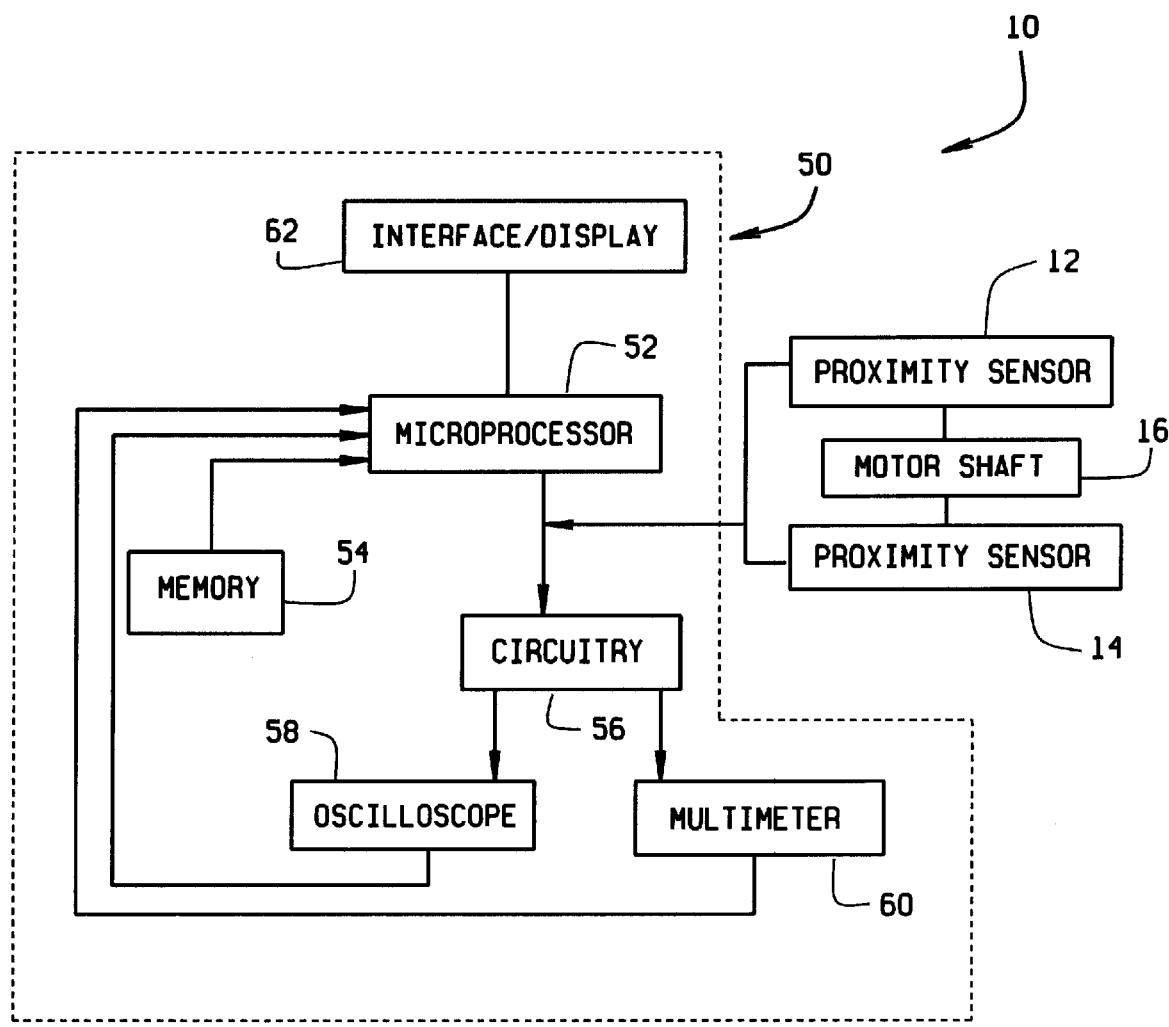
FIG. 2 is a full schematic view of the non-contact motor testing apparatus shown in FIG. 1.

FIG. 2 is a full schematic view of non-contact automated motor shaft testing apparatus 10 including first and second proximity sensors 12, 14 coupled to an automated motor testing system 50. Motor testing system 50 includes a microprocessor 52 coupled to a memory 54 and further operatively coupled to known circuitry 56 adapted for an oscilloscope function or feature 58 and/or a digital multimeter function or feature 60. Circuitry 56 transforms oscillating output signals of first and second proximity sensors 12, 14 when shaft 16 is rotated to an easily processed form by microprocessor 52. A display 62 is coupled to microprocessor 52 for displaying messages and indicia of testing operations to an operator. Automated motor testing system equipment capable of performing the functions described below is well known.

Figure 3:
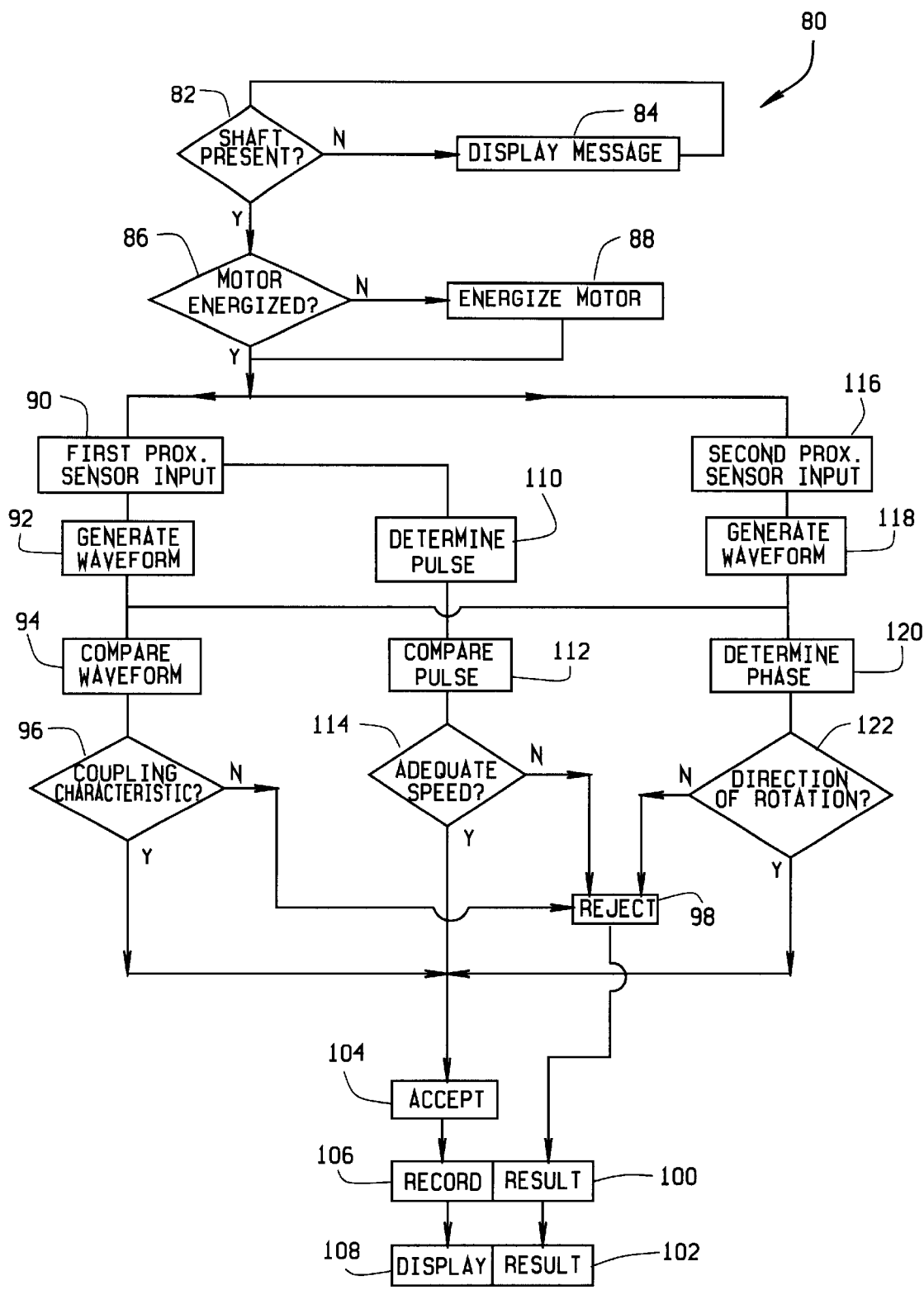
FIG. 3 is a flow chart illustrating a method for conducting non-contact testing of a motor.

FIG. 3 is a flow chart illustrating a non-contact motor shaft testing method 80 for implementation by microprocessor 52 (shown in FIG. 2). First, microprocessor 52 determines 82 whether non-contact testing apparatus 10 is ready for testing, i.e., whether motor shaft 16 and proximity sensors 12, 14 (shown in FIG. 2) are properly oriented relative to one another, by checking for a minimum signal strength of output signals from sensors 12, 14. If positioning problems exist, microprocessor 52 displays 84 a fault message, alarm, or other audible or visual indicia to an operator to correct positioning of motor shaft 16 and/or first and second proximity sensors 12, 14.

If positioning of first and second proximity sensors 12, 14 is acceptable, microprocessor 52 determines 86 whether the motor is energized, such as by checking an input signal to the motor or by monitoring a direct power connection from testing apparatus 10 to the motor. If the motor is not energized, microprocessor 52 energizes 88 the motor, or displays a fault message, alarm or other audio visual indicia to notify an operator for investigation and correction of the non-energization of the motor.

If the motor is energized, an output signal from first proximity sensor is input 90 into circuitry 56 (shown in FIG. 2) and processed, using the oscilloscope function 58 (shown in FIG. 2), to generate 92 a waveform of the oscillating output signal from first proximity sensor 12 (shown in FIG. 2). Microprocessor 52 then compares 94 the generated waveform corresponding to the output signal from first proximity sensor to empirically determined threshold waveform characteristics loaded into memory, such as, for example, a comparison of an amplitude of a generated waveform and an empirically determined threshold amplitude indicative of a motor shaft characteristic of interest. By comparing 94 the generated waveform to values stored in memory, microprocessor 52 is able to determine 96 the presence or absence of a coupling characteristic, such as, for example, flat 18 (shown in FIG. 1) or keyway (not shown). Also, when dimensional differences between types of coupling characteristics permit, microprocessor 52 is also able to identify a type of coupling characteristic, e.g. whether the coupling characteristic is flat 18 or a keyway, based upon comparative evaluation of waveform characteristics.

If shaft 16 (shown in FIG. 2) is determined 96 not to have a shaft coupling characteristic when a customer desires one, the motor is flagged or otherwise designated as a reject 98, the reject event is recorded 100 into memory 54 (shown in FIG. 2) for later retrieval and analysis, and a message, alarm or other audible or visual indicia is generated 102 to notify an operator of a rejected motor. A rejected motor may be flagged electronically or physically by known methods to identify rejected motors and prevent shipment of rejected motors to customers. The rejected motor is either automatically removed from further processing with known control mechanisms or manually sorted and separated from acceptable motors.

If a particular shaft 16 is determined 96 to have a shaft coupling characteristics when a customer desires one, the motor is flagged as an accept 104, the accept event is recorded 106 unto memory 54 (shown in FIG. 2) for later retrieval and, optionally, a message, alarm or other audible or visual indicia is generated 108 to notify an operator of an accepted motor. An with acceptable coupling characteristics. Each accepted motor is then tested for another item of interest, such as motor speed.

To determine motor speed, the output signal from first proximity sensor 12 (shown in FIG. 2) is input 90 into circuitry 56 (shown in FIG. 2) and processed, using the digital multimeter function 60 (shown in FIG. 2), to determine 110 a frequency, or pulse, of the oscillating output signal from first proximity sensor 12 when motor shaft 16 (shown in FIG. 2) is energized and rotated. Microprocessor 52 (shown in FIG. 2) then compares 112 the determined pulse corresponding to the output signal from first proximity sensor 12 to empirically determined pulse values loaded into memory 54 (shown in FIG. 2). By comparing 112 the generated waveform to values stored in memory 54, microprocessor 52 is able to determine 114 the speed of the motor, i.e., the speed of rotation of motor shaft 16.

If the determined speed 114 is unacceptably high or low in comparison to a target value, the motor is flagged as a reject 98, the reject event is recorded 100 into memory 54 for later retrieval and analysis, and a message, alarm or other audible or visual indicia is generated 102 to notify an operator of a rejected motor. The rejected motor is either automatically removed from further processing or manually sorted and separated from acceptable motors to prevent shipping of a rejected motor to a customer.

If the determined speed 114 is acceptable, the motor is flagged as an accept 104, the accept event is recorded 106 into memory for later retrieval and analysis, and, optionally, a message, alarm or other audible or visual indicia is generated 108 to notify an operator of a motor with an acceptable speed. The accepted motor is then tested for another item of interest, such as a direction of rotation of shaft.

To determine direction of rotation of shaft, an output signal from second proximity sensor 14 (shown in FIG. 2) is input 116 into circuitry 56 (shown in FIG. 2) and processed, using the oscilloscope function 58 (shown in FIG. 2), to generate 118 a waveform of the oscillating output signal from second proximity sensor 14. Microprocessor 52 then compares the generated waveforms corresponding to the output signal from first proximity sensor 12 (shown in FIG. 2) and second proximity sensor 14 to determine 120 a phase difference between the two waveforms, which, in turn, indicates a phase difference between the two output signals of proximity sensors 12, 14. The direction of rotation of the shaft, i.e., clockwise or counter-clockwise rotation, is determined 122 by the relative phase difference between the waveforms.

If a particular shaft is determined 122 to have an improper direction of rotation, the motor is flagged as a reject 98, the reject event is recorded 100 into memory 54 (shown in FIG. 2) for later retrieval and analysis, and a message, alarm or other audible or visual indicia is generated 102 to notify an operator of a rejected motor. The rejected motor is either automatically removed from further processing or manually sorted and separated from acceptable motors to prevent shipping of a rejected motor to a customer.

If a particular shaft is determined 122 to have a proper direction of rotation, the motor is flagged as an accept 104, the accept event is recorded 106 into memory for later retrieval and analysis, and, optionally, a message, alarm or other audible or visual alarm is generated 108 to notify an operator of a motor with a proper direction of rotation. The motor may then be tested for other items of interest.

Once a motor is rejected for any of an absent coupling characteristic 96, inadequate speed 114, or improper direction of rotation 122, it is removed from testing apparatus 10 (shown in FIG. 2) and another motor shaft is positioned in motor testing apparatus 10 for testing. Only motors that are acceptable in each shaft characteristic are processed for shipping to a customer. It is contemplated that in various alternative embodiments, less than all three of the stated shaft characteristics may be of interest, and hence all three need not be tested without departing from the scope of the invention. By recording 100, 106 reject and accept events, detailed reports can be generated for statistical analysis to optimize manufacturing and testing operations.

Figure 4:
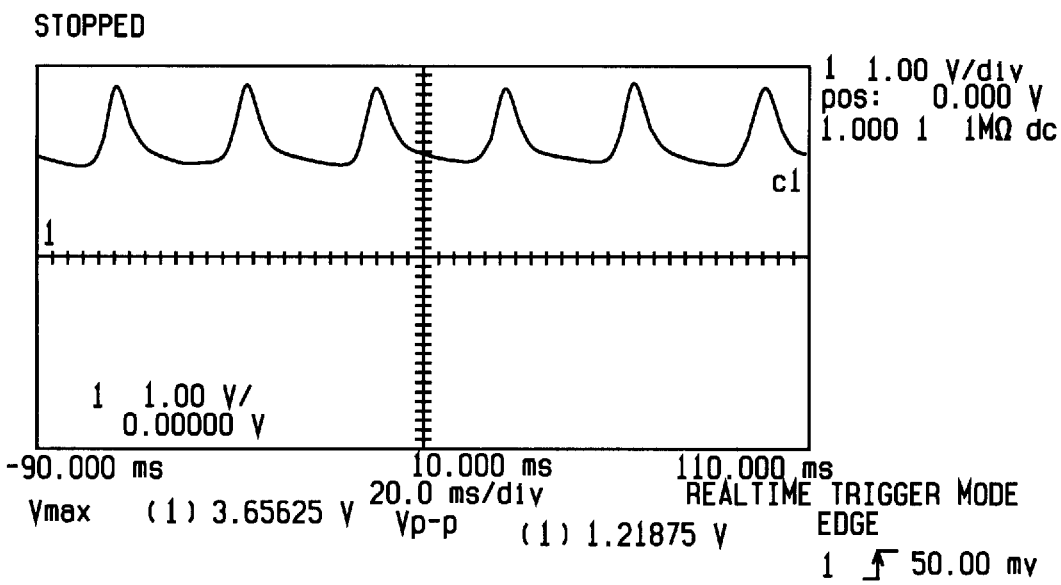
FIG. 4 is an exemplary waveform generated by the apparatus shown in FIG. 2 for a motor with a shaft coupling feature.

By way of example, FIG. 4 is an exemplary waveform generated by testing apparatus 10 (shown in FIGS. 1 and 2) for a motor with a shaft coupling feature. More specifically, first proximity sensor 12 was positioned approximately ⅛ inch from a shaft 16 of a four pole induction motor running at a no load speed of 1800 rpm. When flat 18 of motor shaft was exposed to first proximity sensor face 24, the waveform of FIG. 7 was generated from output terminal 32 of first proximity sensor 12. A peak-to-peak voltage of the periodic wave is approximately 1.72 volts.

Figure 5:
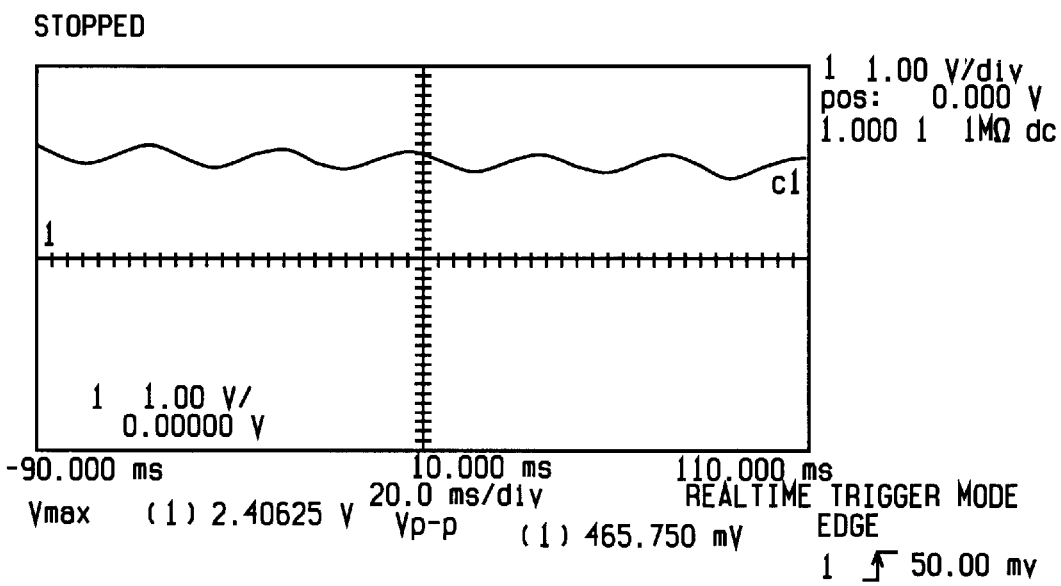
FIG. 5 is an exemplary waveform generated by the system shown in FIG. 2 for a motor without a shaft coupling feature.

In contradistinction, FIG. 5 is an exemplary waveform generated by testing apparatus 10 (shown in FIG. 2) when the same motor is outfitted with a ¹⁄₁₆ inch thick steel cylindrical sleeve (not shown) to simulate a motor shaft without a coupling characteristic. A peak-to-peak voltage of less than 0.5V is noted, considerably less than when flat 18 was exposed (see FIG. 7). It is also noteworthy that it is possible to differentiate a rotating shaft from a stationary shaft through analysis of the waveform, particularly a speed dependent shaft run-out indicative of rotation, which may be used to confirm that the motor started when it was energized.

Therefore, by empirically determining threshold values for shafts with and without particular characteristics, and by comparing waveform characteristics of tested motors to those threshold values it is possible to accurately detect motor shaft characteristics without contacting the tested shaft.

Non-contact testing of motor shafts is advantageous over known contact testing techniques in at least the following exemplary aspects. Precise radial positioning of motor shaft testing equipment required by contact testing is eliminated. Wear of contact components over time which negatively affects system calibration is avoided. Proximity sensors adequately respond to shaft speeds of up to 3600 rpm, so very short start up sequences may be used in motor testing that are beyond the capability of contact systems. In addition, electronic filtering circuitry required by contact vibration techniques is unnecessary. Thus, an accurate, long life motor shaft testing apparatus is provided that accurately and reliably tests motor shaft characteristics.

While the invention has been described in terms of various specific embodiments, those skilled in the art will recognize that the invention can be practiced with modification within the spirit and scope of the claims.

What is claimed is:

1. A method for non-contact testing of a rotating shaft using a motor testing apparatus including a first proximity sensor coupled to an automated motor testing system, said motor shaft testing system including at least one of a digital multimeter feature and an oscilloscope feature, the method comprising the steps of:

orienting the first proximity sensor and motor shaft to generate a first output signal from the first proximity sensor due to presence of the shaft;

generating a first waveform corresponding to the first proximity sensor signal output when the motor is energized; and comparing the first generated waveform to a predetermined threshold to determine the presence or absence of a coupling feature on the shaft.

2. A method in accordance with claim 1 wherein said step of comparing the waveform to a predetermined threshold comprises the step of comparing an amplitude of the generated waveform to a threshold amplitude.

3. A method in accordance with claim 1 further comprising the step of accepting or rejecting the motor based on the compared waveform and the predetermined threshold.

4. A method in accordance with claim 1 further comprising the step of determining a frequency of the generated first signal, thereby indicating a speed of rotation of the shaft.

5. A method in accordance with claim 1 wherein the motor shaft testing apparatus includes a second proximity sensor coupled to the automated shaft testing system, said method further comprising the steps of:

orienting the second proximity sensor and the motor shaft to generate a second output signal from the second proximity sensor due to presence of the shaft;

generating a second waveform corresponding to the second output signal; and comparing the first and second waveforms to determine a phase relationship between the two waveforms, thereby indicating a direction of rotation of the shaft.

6. A method in accordance with claim 5 further comprising the step of accepting or rejecting the motor based upon the determined phase relationship.

7. A method in accordance with claim 5 wherein the step of orienting the second proximity sensor comprises the step of orienting the second proximity sensor approximately 180 degrees from the first proximity sensor.

8. A method in accordance with claim 5 further comprising the step of determining a frequency of one of the generated first and second signal, thereby indicating a speed of rotation of the shaft.

9. A motor shaft testing apparatus for non-contact testing of a rotating motor shaft comprising:

an automated motor testing system comprising a processor and circuitry adapted for at least one of a digital multimeter function and an oscilloscope function; and a first proximity sensor coupled to said motor testing system for generating a first signal when the shaft is rotated, said automated test system configured to generate a first waveform for determining a presence of a shaft coupling characteristic.

10. A motor shaft testing apparatus in accordance with claim 9 wherein said microprocessor is programmed to determine said presence of said shaft coupling characteristic by comparative evaluation of said generated first signal with predetermined threshold values.

11. A motor shaft testing apparatus in accordance with claim 10 wherein said automated test system further comprises a memory, said memory loaded with predetermined threshold values.

12. A motor shaft testing apparatus in accordance with claim 10 wherein said automated test system is configured for generating a rejection flag when said generated signal does not conform to said predetermined threshold values.

13. A motor shaft testing apparatus in accordance with claim 9 further comprising a second proximity sensor for generating a second signal when the shaft is rotated, said second proximity sensor coupled to said testing system for generating a second waveform for comparison with said first waveform to determine a direction of rotation of the shaft.

14. A motor shaft testing apparatus in accordance with claim 13 wherein said automated motor testing system circuit is adapted for determining a fixed magnitude pulse from each oscillatory signal output of said first and second proximity sensors.

15. A motor shaft testing apparatus in accordance with claim 14 wherein said microprocessor is programmed for comparative evaluation of said signals to determine said phase relationship.

16. A motor shaft testing apparatus in accordance with claim 15 wherein said microprocessor is programmed to generate a flag for indicating said determined direction of rotation.

17. A motor shaft testing apparatus in accordance with claim 13 wherein said first and second sensors are positioned approximately 180 degrees apart from a center of the shaft.

18. A motor shaft testing apparatus in accordance with claim 17 further comprising a sensor bracket for maintaining a predetermined distance between the centers.

19. A motor shaft testing apparatus in accordance with claim 9 wherein said proximity sensor is a linear inductive sensor.

20. A motor shaft testing apparatus in accordance with claim 9 wherein said automated motor testing system is configured to determine a frequency of the generated first signal, thereby indicating a speed of rotation of the shaft.

* * * * *